US005758005A

United States Patent [19]

Yoshida

[11] Patent Number: 5,758,005
[45] Date of Patent: May 26, 1998

[54] ANCHOR DEVICE FOR AN OPTICAL CABLE

[75] Inventor: Toshihiro Yoshida. Utsunomiya, Japan

[73] Assignee: The Furukawa Electric Co., Ltd., Tokyo, Japan

[21] Appl. No.: 727,799

[22] Filed: Oct. 7, 1996

[30] Foreign Application Priority Data

Oct. 19, 1995 [JP] Japan .................. 7-271058

[51] Int. Cl.$^6$ .................. G02B 6/00
[52] U.S. Cl. .................. 385/136; 385/101; 385/137; 174/40 R; 361/93
[58] Field of Search .................. 385/136, 137, 385/138, 139, 135, 100, 101; 361/93, 107; 174/40 R, 45 R, 40 CC

[56] References Cited

U.S. PATENT DOCUMENTS 4,821,138  4/1989  Nakano et al. .................. 361/93
5,526,457  6/1996  Rowland et al. .................. 385/101

*Primary Examiner*—Phan T. H. Palmer
*Attorney, Agent, or Firm*—Frishauf, Holtz, Goodman, Langer & Chick

[57] ABSTRACT

An anchor device for an optical cable comprises an anchor clamp for anchoring an optical cable, which is extended along power transmission lines stretched between iron towers, to an iron tower associated therewith, and a semiconductive ring having a predetermined volume resistivity and having a rounded external shape. The semiconductive ring is fixed on the outer peripheral surface of the optical cable in contact with an end of a reinforcing rod of the anchor clamp opposite the tower. By attaching the semiconductive ring, it is possible to lessen the intensity of the electric field of the power transmission lines in the vicinity of that end of the anchor clamp. Even in the case where the outer peripheral surface of the optical cable comes to have electrical conductivity with use for a long term, dry band arcing due to the electric field around the outer peripheral surface of the optical cable is reduced or prevented, thereby preventing the optical cable from being deteriorated in electrical insulation performance or being burned.

6 Claims, 4 Drawing Sheets

ANCHOR DEVICE FOR AN OPTICAL CABLE

BACKGROUND OF THE INVENTION

1. Field of the Invention

The present invention relates to an anchor device for an optical cable, and more particularly, to an anchor device for anchoring an optical cable extended along overhead power transmission lines to a support.

2. Description of the Related Art

An optical cable is often extended along power transmission lines which are stretched between upstanding supports such as iron or steel towers. The optical cable thus installed in the open air is exposed to the atmosphere, rain, fog, etc. Since the air, rain, fog and the like sometimes contain pollutants or salt, electrically conductive substances eventually adhere to the surface of the electrically insulated optical cable, imparting electrical conductivity to the surface of the optical cable. In other words, a conductive path is formed on the surface of the optical cable. Also, the optical cable extended along power transmission lines is subjected to an intense electric field exerted by the power transmission lines, and capacitive coupling is caused between the surface of the optical cable having electrical conductivity and the power transmission lines.

In cases where an optical cable is stretched between iron towers as mentioned above, generally it is anchored to each tower by means of an anchor clamp made of metal. If the surface of such an optical cable has electrical conductivity and the insulation performance between the surface of the optical cable and the anchor clamp is thereby lowered, a current flow from the conductive path on the surface of the optical cable to the iron tower through the anchor clamp is caused by electrostatic induction. This ground current heats the conductive path, with the result that part of the conductive path may possibly lose its electrical conductivity or be destroyed, creating an interruption in the conductive path.

In such a case, dry band arcing occurs at the interrupted part of the conductive path and intense heat is generated there, so that the surface of the optical cable is carbonized due to intense heat. Namely, so-called tracking is caused on the surface of the optical cable. As a result, the insulation performance of the optical cable is lowered, and in some cases the optical cable is burned.

To prevent the tracking of optical cables from occurring, conventionally, materials having excellent tracking resistance are used as insulating materials for optical cables, or an insulator is interposed between the anchor clamp and the iron tower to provide electrical insulation between the surface of the optical cable and the tower.

However, insulating materials having high tracking resistance are expensive, and even if an optical cable is produced using such an insulating material, tracking cannot be sufficiently prevented. Also, if pollutants adhere to the surface of the insulator or if the surface of the insulator gets wet, the capability of the insulator to electrically insulate the anchor clamp from the iron tower is lowered. Even by using the insulator, therefore, tracking cannot be satisfactorily prevented.

SUMMARY OF THE INVENTION

The inventor of the present invention found that "in a region around an optical cable extended along a power transmission line stretched between supports, an electric field distribution is formed such that the electric field strength is especially intense in the vicinity of an end of the anchor clamp opposite the support to which the clamp is coupled." Based on the finding, the inventor came to the understanding that "such an electric field distribution is one of the prime causes of tracking of optical cables," and to the understanding that "the reason for the formation of the above electric field distribution is that the anchor clamp, which includes wires, a rod, a sleeve or the like has an edge (pointed part) at a location where its peripheral surface and end face meet."

An object of the present invention is to provide an anchor device for an optical cable which can prevent with reliability and at low cost an optical cable extended along power transmission lines from being deteriorated in electrical insulation performance or being burned due to tracking.

According to the present invention, there is provided an anchor device for anchoring an optical cable to a support, the optical cable being extended along a power transmission line stretched between supports arranged at a distance from each other. The anchor device of the present invention comprises an anchor clamp for anchoring an electrically insulated optical cable having an outer peripheral surface to a corresponding one of the supports. The anchor clamp has a support-side end and an end opposite the support and is anchored to the support at the support-side end. The anchor device also comprises an electric field relaxing member attached to the outer peripheral surface of the optical cable in contact with the end of the anchor clamp opposite the support. The electric field relaxing member is made of an electrically conductive material and has a rounded external shape.

In the anchor device according to the present invention, the electric field relaxing member having a rounded external shape and made of an electrically conductive material is attached to the optical cable in contact with the end of the anchor clamp opposite the support, to thereby lessen the electric field intensifying effect caused by the end (edge) of the anchor clamp. As a result, the electric field distribution near the end of the anchor clamp opposite the support varies so that the electric field strength at this end, which greatly contributes to tracking of the optical cable, may be lessened, whereby the occurrence of tracking is reduced or prevented.

Preferably, the electric field relaxing member is formed as a member separate from the anchor clamp. In this case, anchoring an optical cable to a support can be achieved using an existing anchor clamp. The cost of the anchor device can, therefore, be reduced.

The end of the anchor clamp opposite the support may be covered with the electric field relaxing member. In this case, the end of the anchor clamp opposite the support is not exposed to the external space at all and the electric field strength near this end can be lessened without fail, whereby tracking of the optical cable can be reliably prevented.

The electric field relaxing member is preferably made of a semiconductive material having a volume resistivity falling within a range of $10^2$ to $10^7$ $\Omega$-cm. In this case, the electric field relaxing effect of the electric field relaxing member can be achieved with reliability.

Preferably, the electric field relaxing member includes first and second semi-annular elements coupled together, and these semi-annular elements are adapted to be releaseably engaged with each other at respective distal ends. The semi-annular elements permit the optical cable to be inserted therein from between the distal ends when disengaged from each other, and are fixed on the outer peripheral surface of the optical cable when engaged with each other with the optical cable passed therethrough. According to this preferred embodiment, the electric field relaxing member can be quickly and reliably attached to an optical cable.

Preferably, the optical cable is a self-supporting type optical cable comprising only nonmetallic component parts. With the anchor device according to the present invention, it is possible to reduce or prevent the occurrence of tracking of a self-supporting type optical cable, which in general is extended along high-voltage power transmission lines and thus subjected to an extremely intense electric field exerted by the power transmission lines.

DETAILED DESCRIPTION OF THE PREFERRED EMBODIMENTS

Figure 1:
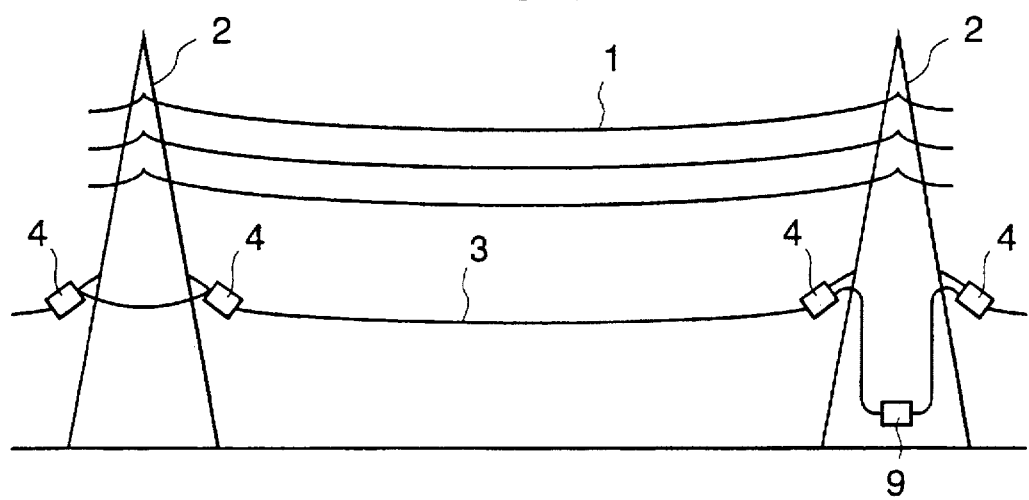
FIG. 1 is a schematic view of an optical cable extended along power transmission lines stretched between iron towers.

Referring to FIG. 1, power transmission lines 1 are stretched between upstanding supports arranged at a distance from each other, for example, between iron or steel towers 2. Between the towers 2, an optical cable 3 is also stretched at a location below and nearly parallel to the power transmission lines 1.

In the case where high-voltage power transmission lines are used, the electric field exerted by the power transmission lines 1 is especially strong. In such a case, a self-supporting type optical cable 3 is preferably used. In a typical self-supporting type optical cable, all of its component parts are made of nonconductive materials.

Figure 2:
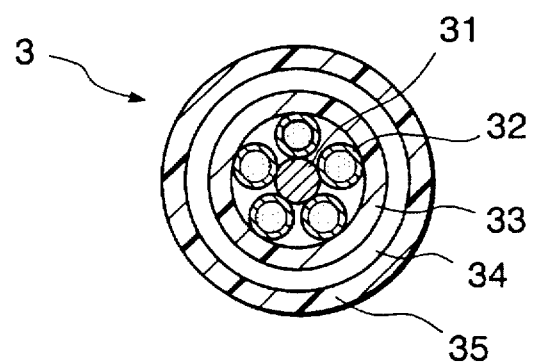
FIG. 2 is a schematic sectional view of a self-supporting type optical cable.

The self-supporting type optical cable 3 shown in FIG. 2 by way of example includes a dielectric central member 31, which is surrounded by optical fiber cables 32 each having a group of optical fibers covered with a tube. These fiber cables 32 are covered with a polyethylene inner sheath 33. Flooding/filling compounds are filled in the space between adjacent fiber cables 32 enclosed by the inner sheath 33. The inner sheath 33 is further surrounded by a polyethylene outer sheath 35 with an aramid yarn layer 34 interposed therebetween.

Figure 3:
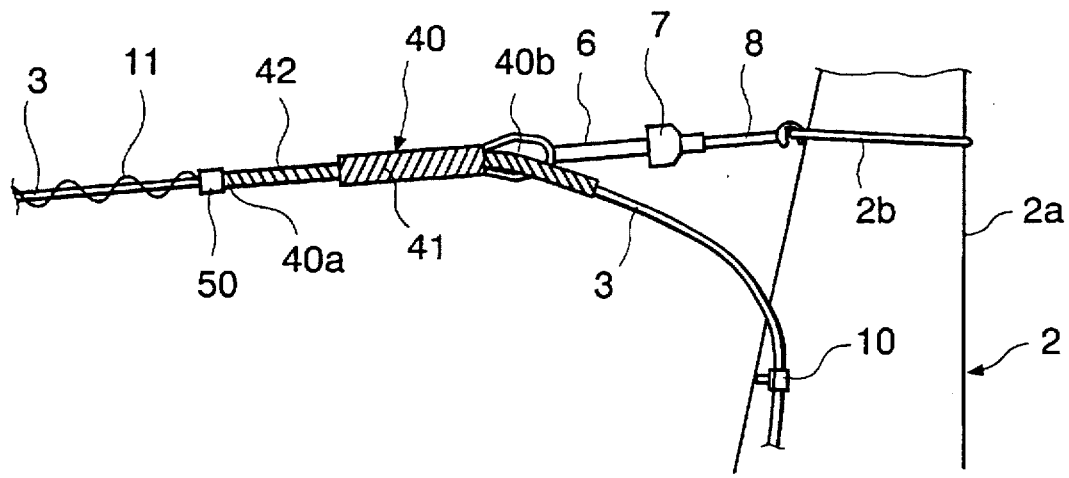
FIG. 3 is a schematic side view showing an anchor device according to one embodiment of the present invention, together with its peripheral elements.

As shown in FIG. 3, the optical cable 3 is anchored to the iron tower 2 by means of an anchor device 4. The anchor device 4 comprises an anchor clamp 40 for anchoring the optical cable 3 to the iron tower 2, and an electric field relaxing member 50 attached to the optical cable 3 in such a manner that the member 50 is in contact with an end 40a of the anchor clamp 40 opposite the iron tower 2.

The anchor clamp 40 of this embodiment is made up of wires 41 and a reinforcing rod 42 fitted on the optical cable 3. Each of the wires 41 is loosely curled beforehand to have a peculiarity of being easily formed into a helix, each wire being bent at its axial intermediate portion in a U-shape. When attaching the anchor clamp 40 to the optical cable 3, with bent ends of the individual wires 41 directed toward the iron tower 2, the wires 41 are stranded together so as to be helically wound around the outer peripheral surface of the reinforcing rod 42. The reinforcing rod 42 may be comprised of a wire preformed into a helix, for instance.

In FIG. 3, reference numeral 40b denotes a ring-like connecting part formed by the bent ends of the wires 41 wound around the reinforcing rod 42. This connecting part 40b is coupled to one side of a first coupling unit 6 opposite the iron tower 2. The other side of the first coupling unit 6 is coupled to a second coupling unit 8 via an insulator 7, and the second coupling unit 8 is coupled to a plate 2b attached to one leg 2a of the iron tower 2. In this manner, the optical cable 3 is anchored to the iron tower 2 by means of the anchor clamp 40.

Reference numeral 10 in FIG. 3 represents a mounting member attached to the leg 2a of the iron tower 2. The optical cable 3 is securely fixed to the iron tower 2 by means of this mounting member 10 and extends toward an outdoor connection box (shown at 9 in FIG. 1) which is fixed on the tower 2. Reference numeral 11 denotes a damper wound around the outer peripheral surface of the optical cable 3 for preventing aeolian vibration of the cable 3. The damper 11 comprises a wire made of an electrically insulating material. Since FIG. 1 is only a schematic illustration, details shown therein are not in exact consistency with FIG. 3.

The electric field relaxing member 50 is made of an electrically conductive or semiconductive material. In this embodiment, a semiconductive ring shown in FIGS. 4 through 7 is used as the electric field relaxing member 50.

The semiconductive ring 50 has first and second semicircular elements 51 and 52, and a coupling element 53 connecting bases of the elements 51 and 52 to each other. The elements 51, 52 and 53 are formed as a one-piece member. The first and second semicircular elements 51 and 52 have a protuberance 51a and a groove 52a formed at their respective distal ends, and the protuberance 51a is separably engaged with the groove 52a. Namely, the distal ends of the elements 51 and 52 can be engaged with and disengaged from each other. In order not to impede the engagement/ disengagement, that is, opening/closing, of the first and second elements 51 and 52, the coupling element 53 is formed into an arc bulged outward in the radius direction of the ring, as viewed from the end face of the element 53, and has a smaller thickness than the elements 51 and 52 so that it can be bent easily.

Figure 7:
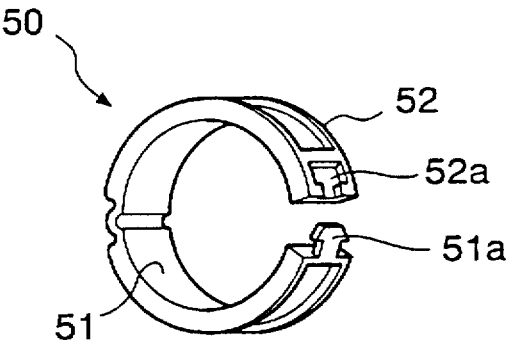
FIG. 7 is a perspective view of the semiconductive ring.

The semiconductive ring 50 has a rounded external shape (FIG. 6) so as to provide an excellent electric field relaxing effect. Although the semiconductive ring 50 shown in FIG. 7 appears to have edges on its outer surface for reasons of convenience of illustration, the edges indicated by the lines in FIG. 7 are in actuality rounded off. The semiconductive ring 50 typically has the following dimensions: width W:

11.0 to 13.0 mm; outer diameter D: 21.0 to 46.8 mm; and inner diameter d: 12.0 to 38.4 mm.

Figure 4:
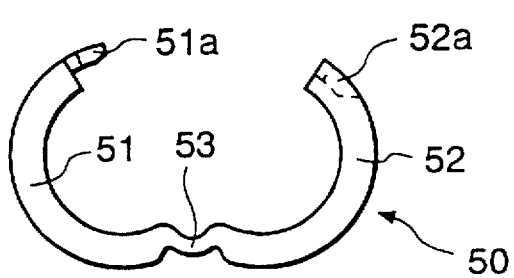
FIG. 4 is an enlarged end view showing a semiconductive ring shown in FIG. 3 in a state in which the ring is opened.
Figure 5:
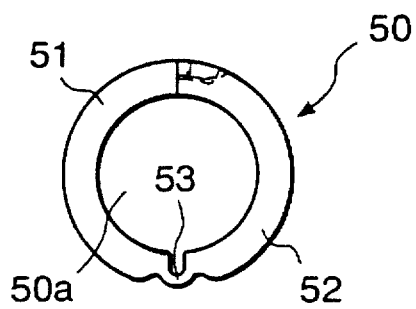
FIG. 5 is an enlarged end view showing the semiconductive ring in a state in which the ring is closed.
Figure 6:
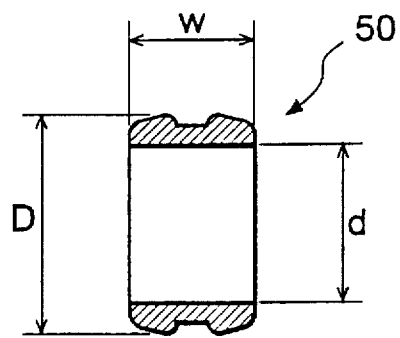
FIG. 6 is a longitudinal sectional view of the semiconductive ring.
Figure 8:
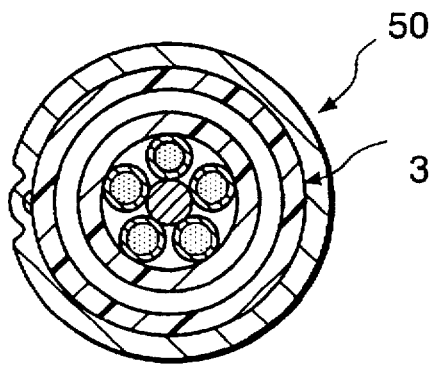
FIG. 8 is a sectional view showing the semiconductive ring in a state in which the ring is fixed on an optical cable.

The semiconductive ring 50 is made of a plastic or hard rubber, for example, and has flexibility. When the distal ends of the first and second elements 51 and 52 of the ring 50 are engaged with each other (FIG. 5), the inner peripheral surfaces of the elements 51 and 52 define a hollow 50a having a diameter substantially equal to the outer diameter of the optical cable 3 and thus capable of receiving the optical cable 3. When the ring 50 is in its free state, the distal ends of the first and second elements 51 and 52 are separate from each other, as shown in FIG. 4, so that the optical cable 3 can be inserted from between the distal ends into the hollow 50a of the ring 50. With the optical cable 3 inserted in the ring 50, the distal ends of the first and second elements 51 and 52 of the ring 50 are engaged with each other, whereupon the ring 50 is firmly fixed on the outer peripheral surface of the optical cable 3 (FIG. 8).

Preferably, the semiconductive ring 50 has a volume resistivity falling within a range of $10^2$ to $10^7$ $\Omega$-cm. To obtain the ring 50, a rubber or plastic material, for example, ethylene-propylene rubber, is mixed with conductive metal fibers, conductive metal powder, carbon fibers, carbon fiber powder, carbon black, acetylene black or the like, and the resulting semiconductive rubber or semiconductive plastic having a volume resistivity falling within the above range is molded into shape. Alternatively, conductive rubber or conductive plastic is flame-sprayed or applied over the entire surface of a ring obtained by molding rubber or plastic into shape.

A brief explanation as to the preferred range of the volume resistivity of the semiconductive ring 50 will be given. A corona discharge starting voltage at the outer surface of the ring 50 becomes lower as the volume resistivity of the ring 50 becomes smaller. Thus, discharge is likely to occur if that ring 50 is employed which has the volume resistivity smaller than the lower limit of the preferred range and which is high in conductivity. Salt, dust, rain or the like sometimes intrudes in between the optical cable 3 and the ring 50 mounted thereon, so that a conductive layer may be formed between these elements 3 and 50. When using the ring 50 having the volume resistivity exceeding the upper limit of the preferred range and hence being poor in conductivity, discharge is likely to occur between the thus formed conductive layer and the metallic anchor clamp.

To anchor the optical cable 3 to the iron tower 2 by means of the anchor device 4 having the above-described arrangement, first, the reinforcing rod 42 is fitted on the optical cable 3. Next, the anchor clamp wires 41 are helically wound around the outer peripheral surface of the reinforcing rod 42 in the aforementioned manner, and the tower-side connecting part 40b of the anchor clamp 40 is coupled to the iron tower via the coupling unit 6, the insulator 7 and the coupling unit 8. Then, with the semiconductive ring 50 brought into contact with the end 40a of the anchor clamp 40 opposite the iron tower 2 (that is, in a state in which corresponding end surfaces of the ring 50 and the rod 42 are in contact with each other, or in a state where the rod end 40a is covered with the ring 50), the distal ends of the first and second elements 51 and 52 of the ring 50 are engaged with each other, whereby the ring 50 is securely fixed on the optical cable 3 (FIG. 8). Since the ring 50 can be brought into engagement by a single operation and also is light in weight, the operating or mounting efficiency is high.

Generally, the end 40a of the anchor clamp 40 or the reinforcing rod 42 has an external shape including an edge, and therefore, the strength of the electric field exerted by the power transmission lines 1 increases in the vicinity of this end. However, by attaching the semiconductive ring 50 having a rounded external shape in such a manner that it contacts with or covers the end 40a of the anchor clamp 40, the electric field strength near this end lessens, and accordingly, even in the case where conductive substances adhere to the outer peripheral surface of the optical cable 3 with a long lapse of time, dry band arcing scarcely occurs at the anchor clamp end 40a, thereby effectively preventing the occurrence of tracking.

To examine the durability of the above-described semiconductive ring 50, ultraviolet-light irradiation using a xenon weatherometer was performed on the ring in accordance with an accelerated exposure testing method for plastic construction materials provided by the Japanese Industrial Standard. After 8800 hours (about one year) of ultraviolet-light irradiation, the outer appearance of the semiconductive ring was visually observed, and the ring had no defects, such as flaws, fissures or cracks, that would make the ring useless.

Figure 9:
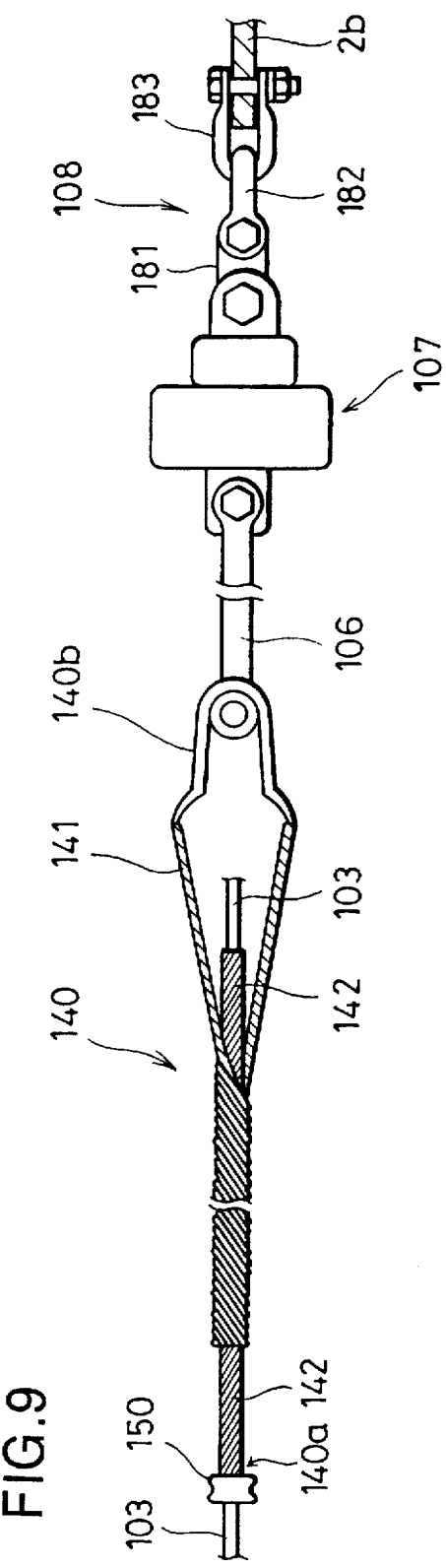
FIG. 9 is a front view of a dead end clamp assembly which includes an anchor device of the same type as that shown in FIG. 3.

Referring now to FIG. 9, a dead end clamp assembly will be explained, which includes an anchor device of the same type as that shown in FIG. 3.

In FIG. 9, those elements corresponding to the elements appearing in FIG. 3 are designated at reference numerals such that the number for each element is equal to the sum of the number for the corresponding element in FIG. 3 and 100.

Referring to FIG. 9, an optical cable 103 is mounted with a reinforcing rod 142 at a location corresponding to an anchor clamp wire winding region, and wires 141 constituting an anchor clamp 140 are wound on the outer peripheral surface of the reinforcing rod 142.

As shown in FIG. 9, the dead end clamp assembly includes an extension link 106 having one end pivotally connected to a thimble clevis 140b of the anchor clamp 140. Another end of the extension link 106 is pivotally connected to a corresponding end of a clevis type insulator 107. Another end of the insulator 107 is coupled to the tower plate 2b constituting the leg 2a of the iron tower 2 via a link plate 181 and first and second U-clevises 182, 183 which are pivotally coupled to one another. As in the case shown in FIG. 3, an electric field relaxing member, for example, a semiconductive ring 150, is fixed on the optical cable 103 in contact with the end 140a of the reinforcing rod 142 of the anchor clamp 140.

Figure 10:
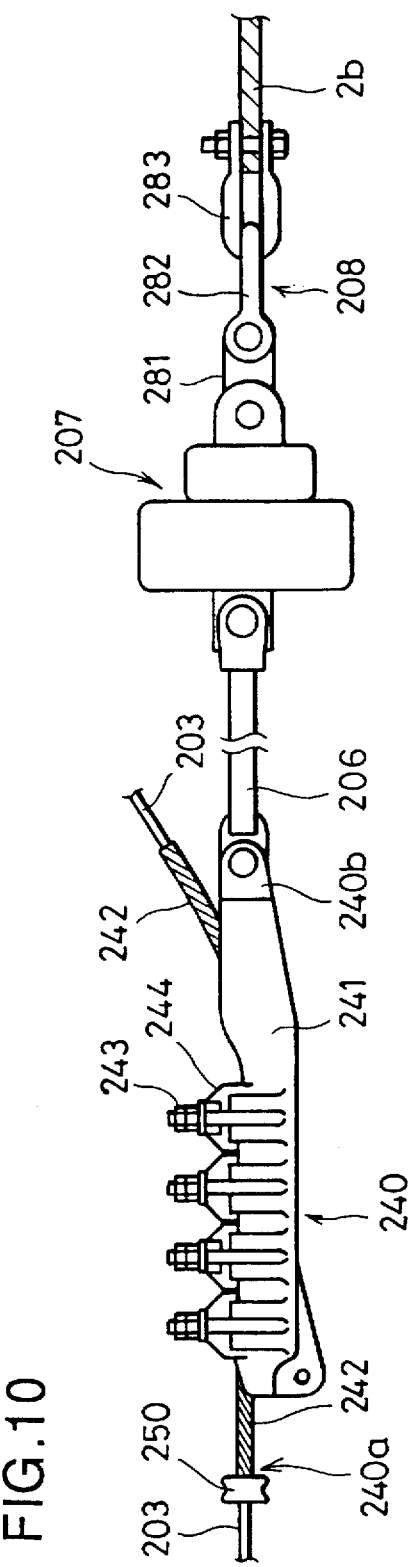
FIG. 10 is a front view of a tension clamp set which includes an anchor device according to a modification of the present invention.

FIG. 10 shows a tension clamp set which includes an anchoring device of a type different from that shown in FIG. 3. The tension clamp set includes a tension clamp (anchor clamp) 240 for holding an optical cable 203 reinforced by a reinforcing member 242. The tension clamp 240 has a clamp body 241, bolts 243 screwed into respective threaded holes formed in the clamp body, and tension plates 244 each held between the head of the corresponding bolt 243 and the clamp body 241 for tensioning the optical cable 203. By adjusting the extent to which the bolts 243 are screwed, it is possible to give suitable tension to the optical cable 203. A semiconductive ring 250 is fitted on the optical cable 203 in contact with an end 240a of the reinforcing member 242 of the tension clamp 240 on the side remote from the iron tower 2.

Another end 240b of the tension clamp 240 on the side close to the iron tower 2 is coupled to the tower plate 2b via a parallel clevis 206, a clevis type insulator 207 and a link-clevis assembly 208 which is comprised of a link plate 281 and first and second U-clevises 282, 283 which are pivotally coupled to one another.

The present invention is not limited to the embodiments described above and can be modified in various ways.

In the foregoing description of the embodiments, the present invention is applied to a self-supporting type optical cable constituted only by nonmetallic component parts, but it can be applied to other types of optical cables.

Further, although in the above embodiments, the electric field relaxing member 50, 150, 250 is formed as a separate member from the anchor clamp 40, 140, 240, the electric field relaxing member and the anchor clamp may be formed as a one-piece member by rounding off the external shape of the end of the anchor clamp opposite the iron tower 2, for example. In other words, the anchor device of the present invention can be constituted solely by an anchor clamp having an electric field relaxing member integrally formed therewith.

Furthermore, in the above embodiments, the anchor clamp 40, 140 used is of the type in which helical wires are wound around the outer peripheral surface of the reinforcing rod 42, 142. Alternatively, a clamp comprising an aluminum sleeve, or a clamp using a wedge effect to anchor an optical cable may be used, for example.

Also, instead of the semiconductive ring 50, 150, 250, a spherical metal member or conductive plastic member may be used, or a semiconductive tape may be wound on the optical cable.

Figure 11:
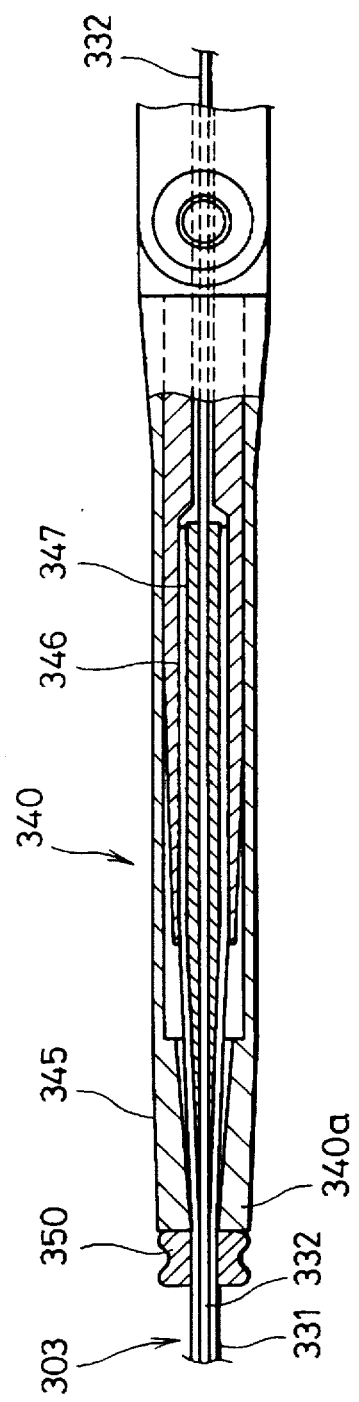
FIG. 11 is a longitudinal sectional view of an anchor clamp according to a further modification of the present invention.

FIG. 11 illustrates an anchor clamp (dead end clamp) for anchoring an optical cable.

An optical cable 303 comprises supporting members 331 and an optical fiber cable 332 surrounded by the supporting members 331. The anchor clamp 340 includes a hollow female member 345, a male member 346 inserted into the hollow of the female member 345, and a hollow protective member 347 inserted into the hollow of the male member 346. The distal end of each of the male member 346 and the protective member 347 is formed like a wedge.

The optical fiber cable 332 is inserted into the hollow of the protective member 347, whereas the supporting members 331 are inserted in between the outer peripheral surface of the protective member 347 and the inner peripheral surface of the male member 346. A ring (not shown) is arranged in the hollow of the male member 346 at a location close to the base of the anchor clamp 340, and pins (not shown) are inserted in respective holes formed in the ring. These pins are made to intervene between the supporting members 331, whereby the supporting members 331 are spaced from one another in the circumferential direction. When the male member 346 is inserted into the hollow of the female member 345, the supporting members 331 are mechanically connected to the anchor clamp 340 due to the wedge effect provided by the female member 345 and the protective member 347. An electric field relaxing member 350 is fixed on the optical cable 303 in contact with an end 340a of the anchor clamp 340 opposite the iron tower 2, as in the case of FIG. 3.

What is claimed is:

1. An anchor device for anchoring an electrically insulated optical cable which is extended along a power transmission line stretched between a plurality of supports arranged at a distance from each other, the anchor device comprising:

an anchor clamp for anchoring the optical cable to a corresponding one of the supports, said anchor clamp having a support-side end anchored to the corresponding one of the supports and a second end opposite the support-side end; and an electric field relaxing member attached to an outer peripheral surface of the optical cable in contact with the second end of said anchor clamp, said electric field relaxing member being made of an electrically conductive material and having a rounded external shape, whereby a strength of an electric field exerted by the power transmission line is reduced at the second end of the anchoring clamp.

2. The anchor device according to claim 1, wherein said electric field relaxing member is formed as a member separate from said anchor clamp.

3. The anchor device according to claim 2, wherein said electric field relaxing member is made of a semiconductive material having a volume resistivity falling within a range of $10^2$ to $10^7$ Ω-cm.

4. The anchor device according to claim 1, wherein the second end of said anchor clamp opposite the support-side end is covered with said electric field relaxing member.

5. The anchor device according to claim 2, wherein said electric field relaxing member includes first and second semi-annular elements which are coupled together and which are capable of engaging with each other at respective distal ends thereof, said first and second semi-annular elements permitting the optical cable to be inserted therein from between the distal ends thereof when disengaged from each other, and being fixed on the outer peripheral surface of the optical cable when engaged with each other with the optical cable passed therethrough.

6. The anchor device according to claim 1, wherein the optical cable is a self-supporting type optical cable comprising only nonmetallic component parts.

* * * * *